(12) United States Patent
Lee et al.

(10) Patent No.: US 9,121,336 B2
(45) Date of Patent: Sep. 1, 2015

(54) DIESEL ENGINE PISTON

(75) Inventors: Myungjun Lee, Yongin-si (KR); Dae Choi, Hwaseong-si (KR); Hyunsung Jung, Anyang-si (KR); Minyoung Ki, Seoul (KR); Hyeungwoo Lee, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 859 days.

(21) Appl. No.: 13/289,917

(22) Filed: Nov. 4, 2011

(65) Prior Publication Data

US 2013/0019838 A1 Jan. 24, 2013

(30) Foreign Application Priority Data

Jul. 18, 2011 (KR) .......................... 10-2011-0070923

(51) Int. Cl.
  *F02B 23/06* (2006.01)
  *F02F 3/22* (2006.01)

(52) U.S. Cl.
  CPC ......... *F02B 23/0651* (2013.01); *F02B 23/0669* (2013.01); *F02B 23/0672* (2013.01); *F02F 3/22* (2013.01); *Y02T 10/125* (2013.01)

(58) Field of Classification Search
  CPC .......... F02B 19/02; F02B 19/10; F02B 19/16; F02B 19/165; F02B 23/0651; F02B 23/0672; F02B 23/0699; F02B 3/22; Y10T 10/125
  USPC .......... 123/193.4, 193.6, 276, 279, 280, 282, 123/285, 298–302, 305–307
  See application file for complete search history.

(56) References Cited

U.S. PATENT DOCUMENTS

| | | | | |
|---|---|---|---|---|
| 4,721,080 A * | 1/1988 | Moriyasu et al. | ............. | 123/276 |
| 5,215,052 A * | 6/1993 | Augustin | ...................... | 123/276 |
| 5,868,112 A * | 2/1999 | Mahakul et al. | ............... | 123/263 |
| 6,161,518 A * | 12/2000 | Nakakita et al. | ............... | 123/298 |
| 6,314,933 B1 * | 11/2001 | Iijima et al. | ................. | 123/193.6 |
| 6,513,477 B1 * | 2/2003 | Gaiser et al. | ................ | 123/193.6 |
| 7,143,738 B2 * | 12/2006 | Ganz et al. | ..................... | 123/295 |
| 7,156,069 B2 * | 1/2007 | Ono et al. | ...................... | 123/276 |
| 7,415,963 B2 * | 8/2008 | Chmela et al. | ................ | 123/299 |
| 7,513,238 B2 * | 4/2009 | Pfaff et al. | ..................... | 123/276 |
| 7,942,126 B2 * | 5/2011 | Zoller | ............................ | 123/298 |
| 8,156,927 B2 * | 4/2012 | Iikubo et al. | .................. | 123/661 |
| 8,671,908 B2 * | 3/2014 | Ives et al. | ....................... | 123/298 |
| 8,677,974 B2 * | 3/2014 | Rothbauer et al. | ............ | 123/298 |
| 2003/0217732 A1 * | 11/2003 | Kataoka et al. | ............... | 123/276 |

(Continued)

FOREIGN PATENT DOCUMENTS

| JP | 5-71347 A | 3/1993 |
|---|---|---|
| JP | 2759375 B2 | 3/1998 |

(Continued)

*Primary Examiner* — Hieu T Vo
*Assistant Examiner* — Sherman Manley
(74) *Attorney, Agent, or Firm* — Morgan, Lewis & Bockius LLP (57) ABSTRACT

A diesel engine piston having a combustion chamber may include a profile surface that protrudes toward a center axis of the combustion chamber from an inner wall thereof and includes a protrusion on the inner wall, the protrusion extending from the inner wall with a predetermined length, wherein the protrusion divides a spray fuel, which may be sprayed and atomized onto the protrusion, into a fuel flow at an upper portion of the combustion chamber and a fuel flow at a lower portion of the combustion chamber, respectively.

9 Claims, 8 Drawing Sheets

(56) References Cited

U.S. PATENT DOCUMENTS

| | | | |
|---|---|---|---|
| 2004/0123832 A1* | 7/2004 | Quigley et al. | 123/276 |
| 2005/0252483 A1* | 11/2005 | Ganz et al. | 123/299 |
| 2006/0090726 A1* | 5/2006 | Meffert et al. | 123/279 |
| 2007/0193556 A1* | 8/2007 | Pfaff et al. | 123/276 |
| 2007/0199538 A1* | 8/2007 | Yuzaki et al. | 123/276 |
| 2009/0025675 A1 | 1/2009 | Ilkubo et al. | |
| 2010/0122686 A1* | 5/2010 | Kim et al. | 123/298 |
| 2010/0258076 A1* | 10/2010 | Eismark et al. | 123/279 |
| 2011/0023819 A1* | 2/2011 | Ives et al. | 123/298 |
| 2011/0253094 A1* | 10/2011 | Rothbauer et al. | 123/276 |
| 2013/0047950 A1* | 2/2013 | Eismark et al. | 123/193.6 |

FOREIGN PATENT DOCUMENTS

| | | |
|---|---|---|
| JP | 2005-188504 A | 7/2005 |
| JP | 2007-270749 A | 10/2007 |
| KR | 1998-035134 U | 9/1998 |
| KR | 10-2008-0097204 A | 11/2008 |
| KR | 10-2009-0025665 A | 3/2009 |

\* cited by examiner

DIESEL ENGINE PISTON

CROSS-REFERENCE TO RELATED APPLICATIONS

The present application claims priority to Korean Patent Application Number 10-2011-0070923 filed Jul. 18, 2011, the entire contents of which application is incorporated herein for all purposes by this reference.

BACKGROUND OF THE INVENTION

1. Field of the Invention

The present invention relates to a diesel engine, particularly a diesel engine piston that greatly increases combustion efficiency by minimizing spray overlap in dual spraying of fuels.

2. Description of Related Art

In general, it is the most important to improve combustion in a diesel engine that ignites and burns fuel by spraying the fuel into a compressed air at a predetermined temperature or more in order to reduce noxious exhaust gas and prevent deterioration of fuel efficiency.

Accordingly, the combustion chamber formed in a piston is shaped such that flow improving mix of air and fuel is formed and fuel atomization is promoted.

The flow means swirl, vortex, or tumble.

The fuel atomization means a technology for increasing a mixing performance with the atmosphere air by allowing a fuel sprayed from an injector to be composed of groups of droplets including many small droplets to increase the surface areas of the droplets.

The promotion of atomization may be implemented by the physical shape of the injector nozzle, interaction with the air hitting in spraying, or hitting against the wall of the combustion chamber, and the structure of the combustion chamber is determined in consideration of further improving this phenomenon.

In general, when at least two or more fuels are simultaneously sprayed into the combustion chamber from the injector, possibility of overlap of the spray fuels in the combustion chamber may increase, such that the risk of incomplete combustion correspondingly increases.

Actually, the incomplete combustion caused by overlap of the spray fuels is necessarily considered in design of the combustion chamber because it reduces the fuel efficiency of the engine and generates a large amount of noxious exhaust gas.

Figure 5:
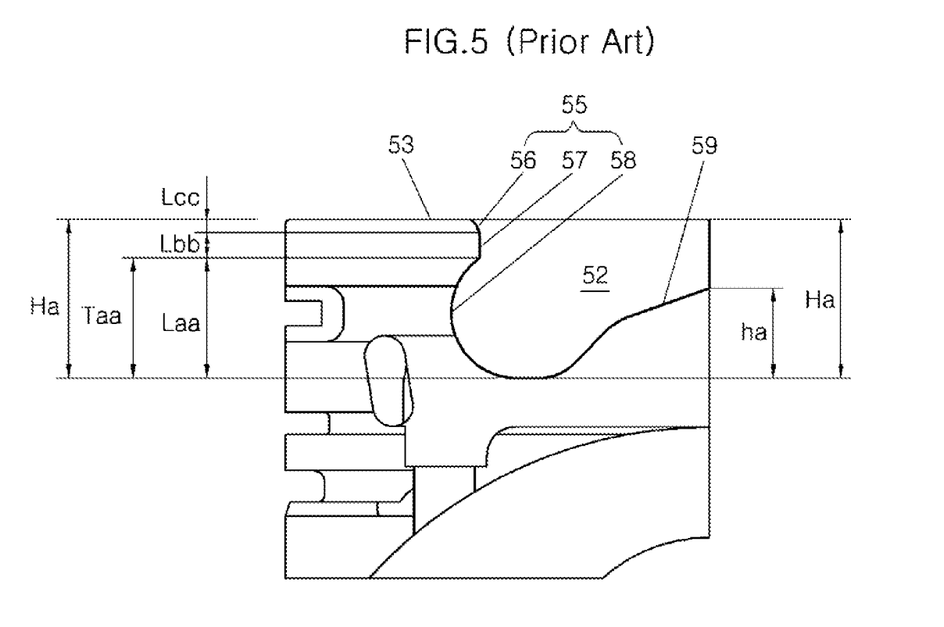
FIG. 5 is a configuration view of a combustion chamber of a diesel engine piston according to the related art.

FIG. 5 shows a partial configuration of a piston having a combustion chamber for promoting flow and fuel atomization.

As shown in the figure, a combustion chamber 52 is a combustion space recessed at a predetermined depth from the top 53 of a piston body 50, the cross-sectional shape of the combustion space is specified by a profile surface 55 forming the inner wall of the combustion space, and the combustion space is made symmetric by a pip 59 protruding into the combustion space from the bottom of the combustion space.

Profile surface 55 forming the inner wall of the combustion space is an important factor that promotes flow and fuel atomization in the combustion space, in the structure of combustion chamber 52.

For this configuration, profile surface 55 forms a protrusion 57 that protrudes inward the combustion space, such that the fuel sprayed from the injector hits against the wall of the combustion chamber and atomization is promoted.

Profile surface 55 forms a bowl rim 58 having an arc shape under protrusion 57 and forms an inclined portion 56 connected to top 53 at an angle above bowl rim 58, such that flow required for the combustion chamber is formed.

The pip 59 inclines at a predetermined angle aa from the center in a substantially conical shape.

Combustion chamber 52 promotes flow and fuel atomization in the combustion space while profile surface 55 and pip 59 are optimally designed with respect to the entire depth Ha of combustion chamber 52 to improve fuel efficiency.

The optimum design is that, for example, for pip 59 protruding into the combustion space, the protrusion height ha is set at a specific ratio to the entire depth Ha of combustion chamber 52, and a formation height Laa of bowl rim 58 of profile surface 55 forming the inner wall of the combustion space, a connection height Lbb of protrusion 57, and an extension height Lcc of inclined portion 56 are set at a specific ratio to the entire depth Ha of combustion chamber 52.

The height Laa+Lbb to protrusion 57 starting to be inclined to form inclined portion 56 at bowl rim 58 is a critical height Taa, which means a set value for more effectively collecting fuel hitting against protrusion 57 to bowl rim 58 where flow is formed.

However, when combustion chamber 52 has the structure described above, flow and fuel atomization in the combustion space is considerably improved, but the risk for overlap of at least two or more fuels sprayed from the injector is still high.

Figure 6A:
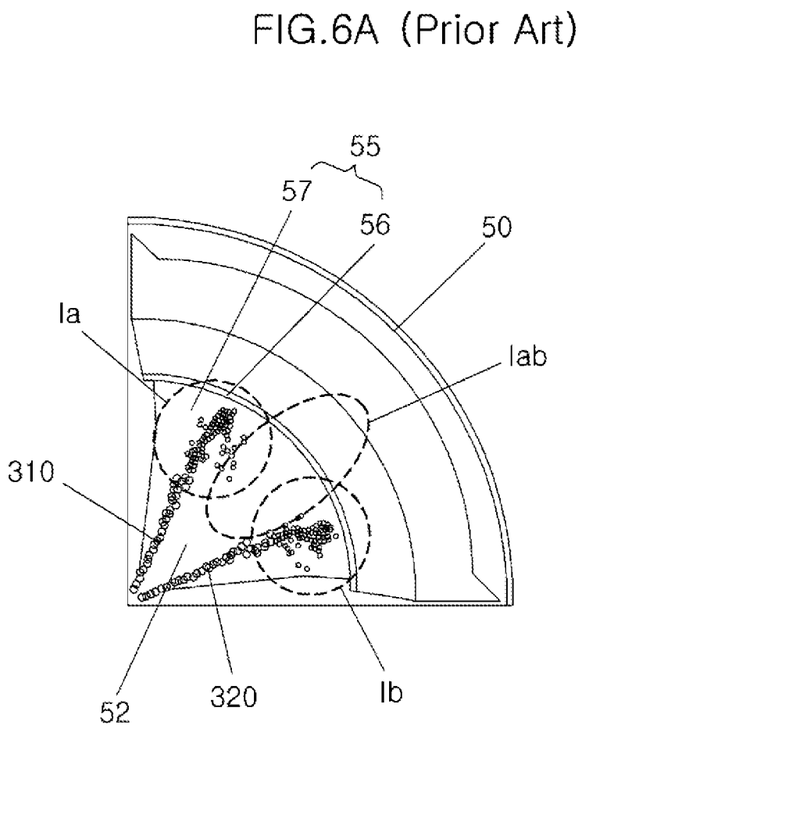
FIG. 6 is a view showing when spray overlap is generated in FIG. 5 in dual spraying of fuels.
Figure 6B:
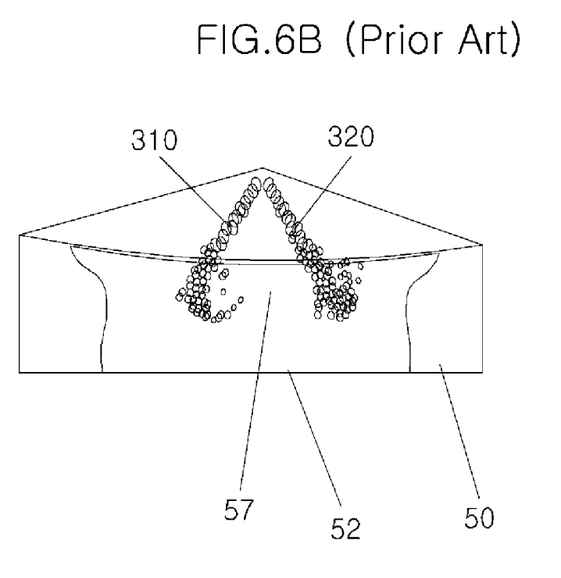

FIGS. 6A and 6B show a spray overlap phenomenon that occurs in duel spraying of fuels in combustion chamber 52 shown in FIG. 5.

As shown in FIG. 6A, first and second spray fuels 310 and 320 that are sprayed into combustion chamber 52 from an injector are divided at predetermined angles and hit against profile surface 55, but as shown in FIG. 6B, first and second spray fuels 310 and 320 have the same spray angles (generally, 152 degrees), such the dispersion areas overlap when the fuels hit against protrusion 57 of profile surface 55.

Therefore, an overlap area Iab is generated between an atomization area Ia where first spray fuel 310 hits against a portion of protrusion 57 and another atomization Ib area where second spray fuel 320 hits against another portion of protrusion 57.

The more the number of spray fuels sprayed into combustion chamber 52 from the injector, the larger the overlap area Iab.

The overlap of the spray fuels causes incomplete combustion and the incomplete combustion further decreases fuel efficiency of the engine and increases the amount of noxious exhaust gas, which has a limit in following the vehicle regulation that becomes restrict(tightened?).

Korean Patent Application Laid-Open No. 10-2009-0025655 (Mar. 11, 2009) relates to an combustion chamber structure of a diesel engine having a variable compression ratio (see FIG. 1, and paragraph Nos. 16 to 18 in Page 3).

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a diesel engine piston that can greatly increase a gas mixture generation ratio by dividing a spray fuel sprayed into a combustion chamber from an injector into flow at the upper space and flow at the lower space, and prevent incomplete combustion reducing fuel efficiency and increasing the amount of noxious exhaust gas by using a height difference between two or more spray fuels sprayed close to each other to deviate from each other in order to prevent overlap.

In an aspect of the present invention, the diesel engine piston having a combustion chamber may include a profile surface that protrudes toward a center axis of the combustion chamber from an inner wall thereof and may include a protrusion on the inner wall, the protrusion extending from the inner wall with a predetermined length, wherein the protrusion divides a spray fuel, which is sprayed and atomized onto the protrusion, into a fuel flow at an upper portion of the combustion chamber and a fuel flow at a lower portion of the combustion chamber, respectively.

The combustion chamber may have a bottom formed by a flat base, and a pip protrudes in a conical shape from the base toward the center axis of the combustion chamber with a predetermined angle and is formed to be symmetric with respect to the center axis of the combustion chamber.

The profile surface may include an inclined portion that is connected to a top of a piston body and the protrusion above the protrusion and forms the upper portion of the combustion chamber The profile surface may further include a bowl rim connected to a base and the protrusion and formed in a recessed arc shape below the protrusion to form the lower portion of the combustion chamber.

A position where the protrusion starts to be connected to the inclined portion faces a traveling direction of the spray fuel sprayed toward the inner wall.

A position where the protrusion starts to be connected to the inclined portion faces a traveling direction of a first spray fuel sprayed toward the inner wall, wherein a position where the protrusion starts to be connected to a bowl rim faces a traveling direction of a second spray fuel sprayed toward the inner wall, wherein the profile surface may further include the bowl rim connected to a base of the combustion chamber and the protrusion and formed in a recessed arc shape below the protrusion to form the lower portion of the combustion chamber.

A length of a formation height and a connection height is substantially the same as a protrusion height of a pip.

An end portion of the base is connected to the bowl rim, wherein the other end portion of the base is formed flat and connected to the pip.

The inclined portion is a flat straight inclined surface and the protrusion is a flat straight vertical surface opposite to the center axis of the combustion chamber.

Edges of the flat straight vertical surface opposite to the center axis of the combustion chamber are rounded, in the protrusion The flat straight vertical surface opposite to the center axis of the combustion chamber is formed at an acute angle or an obtuse angle, in the protrusion.

The inclined portion is connected to the top while diverging with respect to the center axis of the combustion chamber.

The present invention has an effect that it is possible to greatly increase a gas mixture generation ratio by dividing a spray fuel sprayed into a combustion chamber from an injector into flow at the upper space of a combustion chamber and flow at the lower space of the combustion chamber, and considerably reduce or prevent incomplete combustion by preventing overlap of two or more spray fuels sprayed close to each other.

Further, the present invention has an effect that it is possible to greatly increase fuel efficiency of a diesel engine and considerably reduce the amount of noxious exhaust gas, by significantly reducing or preventing incomplete combustion.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention are described hereafter in detail with reference to the accompanying drawings, and the exemplary embodiments can be achieved in various ways by those skilled in the art and the present invention is not limited to the exemplary embodiments.

Figure 1:
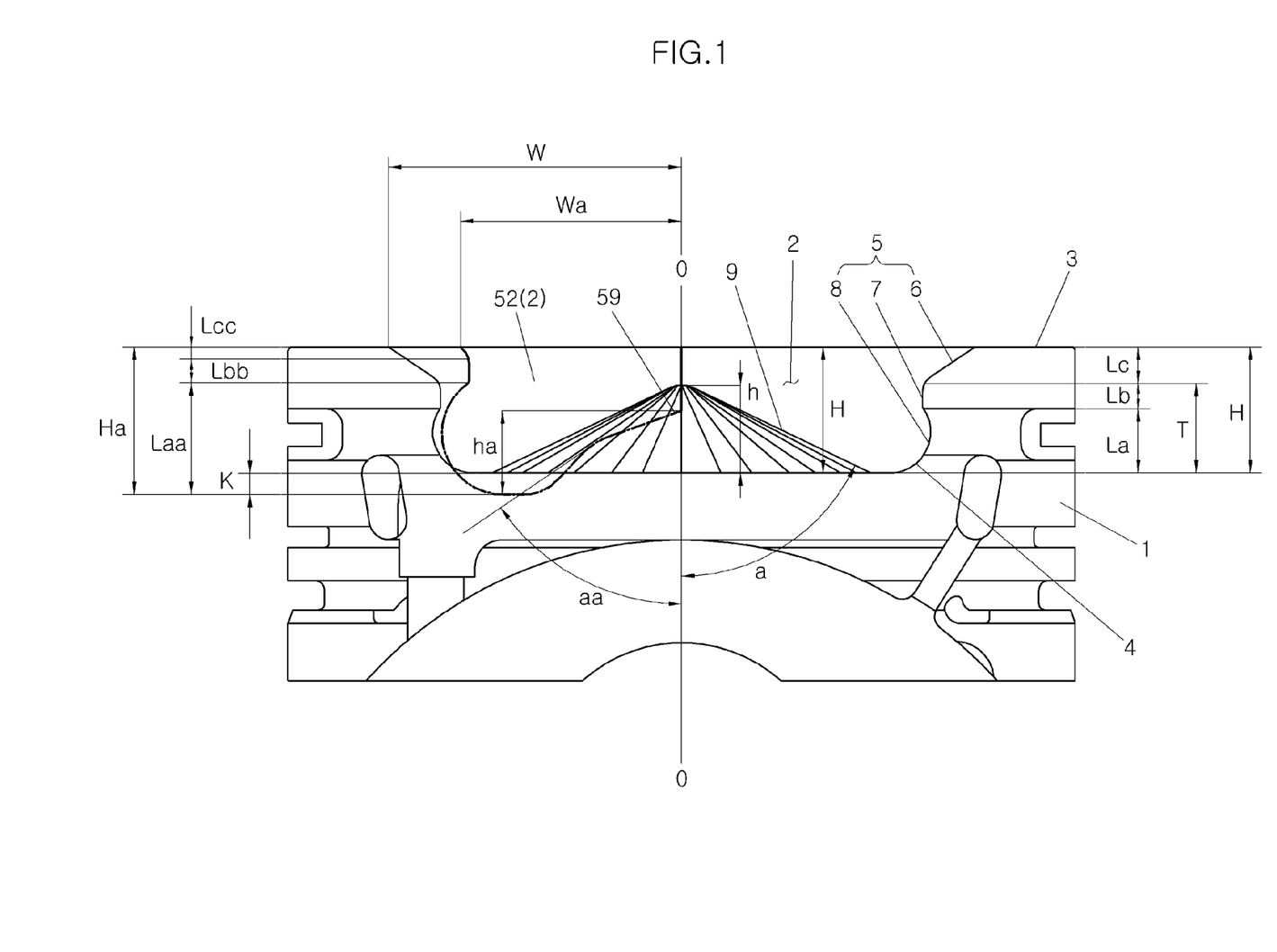
FIG. 1 is a view showing a cross-sectional structure of a diesel engine piston having a combustion chamber in comparison with a related art and an exemplary embodiment of the present invention.

Referring to FIG. 1, a combustion chamber 2 forms a combustion space from the top 3 of a piston body 1 to the base 4 recessed at a predetermined depth, a profile surface 5 forms the inner wall of the combustion space to specify the cross-sectional shape of the combustion space, and a pip 9 protrudes inward the combustion space from the bottom of the combustion space to make the combustion space symmetric to the center 0-0 of piston body 1.

The combustion space is formed in a cylindrical shape and both top 3 and an end portion of base 4 are formed flat.

Profile surface 5 forming the inner wall of the combustion space is also an important factor that promotes flow and fuel atomization in the combustion space, in the structure of combustion chamber 2, as described above.

Profile surface 5 according to the exemplary embodiment also contributes as an important factor that can largely reduce or prevent incomplete combustion by preventing overlap of two or more spray fuels sprayed close to each other.

For this configuration, profile surface 5 includes a protrusion 7 protruding toward the center of the combustion space such that the spray fuel sprayed from the injector hits to be atomized and is divided into upper flow and lower flow, an inclined portion 6 connected to top 3 at an angle above protrusion 7 to form the upper space of the combustion chamber, and a bowl rim 8 connected to base 4 under protrusion 7 to form the lower space of the combustion chamber.

In the exemplary embodiment, inclined portion 6 forms the upper space of the combustion chamber by forming the inclined surface in a flat straight line and diverging with respect to center 0-0 of piston body 1.

In protrusion 7, the vertical surface opposite to center 0-0 of piston body 1 is formed in a flat straight line and the edges are rounded to increase durability.

Protrusion 7 may be formed such that the vertical surface opposite to center 0-0 is formed at an acute angle or an obtuse angle and the angle is changed to improve the mixing ratio of fuels for the upper space or the lower space of the combustion chamber.

Bowl rim 8 forms the lower space of the combustion chamber, in a recessed arc shape from the vertical surface of protrusion 7 to base 4 that is the bottom of the combustion chamber.

Meanwhile, pip 9 makes a conical shape connected to base 4 at a predetermined angle from center 0-0 of piston body 1 to have a predetermined volume and the volume size of the combustion space can be set from the volume.

The optimum design of combustion chamber 2 applied to the exemplary embodiment is for promoting flow and fuel atomization and preventing overlap of spray fuels in the combustion space.

For this configuration, the size ratio and the position ratio of profile surface 5 and pip 9 in respect to the entire depth H of combustion chamber 2 in the combustion space are specified.

When the optimum design is applied, for pip 9 protruding into the combustion space, the protrusion height h is set at a specific ratio to the entire depth H of combustion chamber 2, and a formation height La of bowl rim 8 of profile surface 5 forming the inner wall of the combustion space, a connection height Lb of protrusion 7, and an extension height Lc of inclined portion 6 are set at specific ratios to the entire depth H of combustion chamber 2, which is the same as that of the related art.

However, the applied specific ratios are different in the optimum design according to the exemplary embodiment and the optimum design according to the related art, such that entirely different cross-sectional shape is formed with respect to combustion chamber 52 shown in FIG. 5.

For example, referring to FIG. 1, pip 9 occupies the combustion space relatively larger than pip 59 by increasing protrusion height h larger than protrusion height ha and increasing inclination angle a larger than inclination angle aa.

The shape of pip 9 activates swirl, vortex, or tumble, which is the flow in the combustion space, and in the exemplary embodiment, the mixing of the fuel and the air flowing into the combustion space is improved and the mixing ratio can be greatly increased.

Formation height La of bowl rim 8 is smaller than formation height Laa in profile surface 5 and connection height Lb of protrusion 7 is smaller than connection height Lbb, such that extension height Lc of inclined portion 6 connected from protrusion 7 to top 3 is larger than extension height Lcc.

Bowl rim 8 is formed with the bottom the same as base 4, such that it is reduced by the depth difference K as compared with the bottom of bowl rim 8.

However, as described above, extension height Lc of inclined portion 5 relatively increases, such that in the exemplary embodiment a combustion chamber radius W that is the distance between profiler surface 5 and center 0-0 of piston body 1 is larger than a combustion radius Wa and the combustion space is increased, and accordingly, the volume of the combustion space, which is reduced by pip 9, is compensated.

This means that it is possible to more improve the engine performance when the engine specifications are the same.

Meanwhile, the height La+Lb to protrusion 7 where inclination starts to form inclined portion 6 at bowl rim 8 is a critical height T.

In the exemplary embodiment, critical height T means a position where the fuel hitting against protrusion 7 is led to the upper space of the combustion chamber which is formed by inclined portion 6 above protrusion 7 and to the lower space of the combustion chamber which is formed by bowl rim 8 under protrusion 7.

As protrusion 7 is formed at critical height T, the spray fuel sprayed into the combustion chamber is divided into the flow at the upper space of the combustion chamber and the flow at the lower space, such that the gas mixture generation ratio can be considerably increased.

Figure 2:
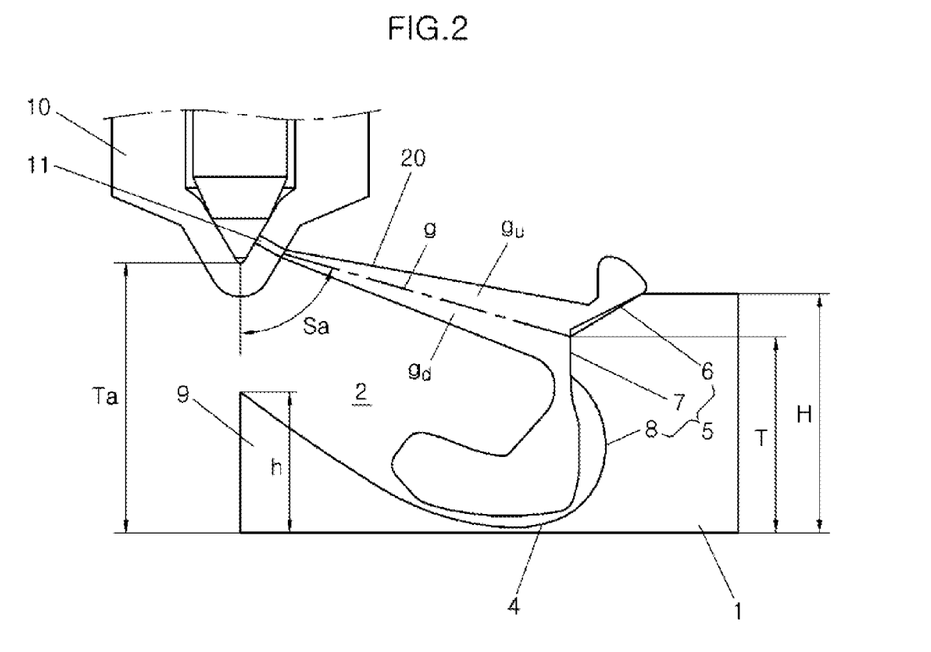
FIG. 2 is an operational view of the combustion chamber of the diesel engine piston according to an exemplary embodiment of the present invention in single spraying of fuel.

Referring to FIG. 2, spray fuel 20 sprayed at a predetermined spray angle Sa from a spray hole of an injector 10 disposed at a predetermined height Ta from the combustion chamber 2 travels and hits against profile surface 5.

The traveling direction g of spray fuel 20 is made toward the upper end of protrusion 7 that is a start point where inclined portion 6 starts to be formed, such that spray fuel 20 hits against protrusion 7 and is divided into the upper flow gu formed by inclined portion 6 at the upper space of the combustion chamber and the lower flow gd formed by bowl rim 8 at the lower space of the combustion chamber.

Traveling direction g of spray fuel 20 may agree with the upper end of protrusion 7 that is the start portion where inclined portion 6 starts to be formed, in accordance with the operation state of the engine.

However, in this case, it can be changed in accordance with the conditions of the engine, such that in the exemplary embodiment, it is not the assumption that the fuel is divided at 50:50 of the upper flow gu and the lower flow gd with respect to the protrusion 7.

When spray fuel 20 is divided into upper flow gu and lower flow gd and disperses uniformly in the combustion space, spray fuel 20 can be more easily mixed with air by using the flow of the air in the combustion space, such that the gas mixture generation ratio is significantly improved.

Figure 3:
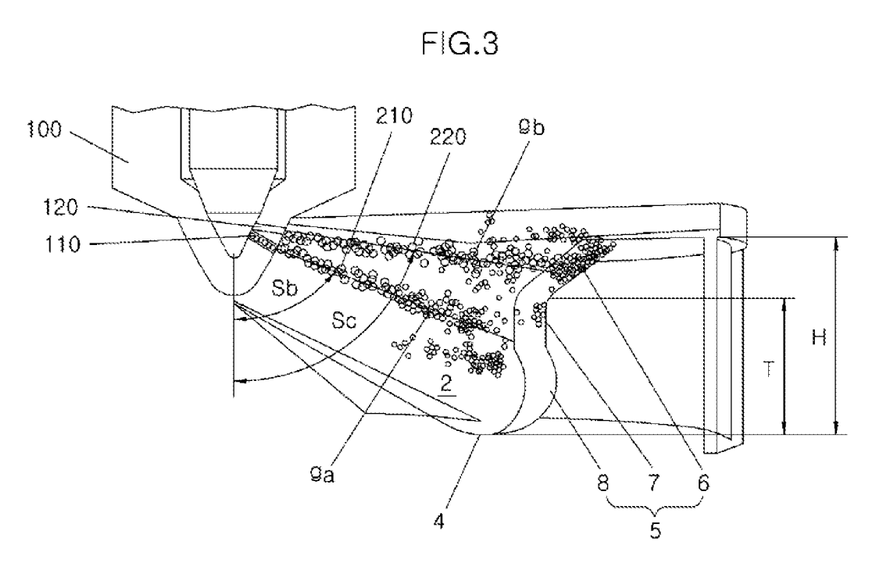
FIG. 3 is an operational view of the combustion chamber of the diesel engine piston according to an exemplary embodiment of the present invention in dual spraying of fuels.

Referring to FIG. 3, when first and second spray fuels 210 and 220 are sprayed at predetermined angles Sb and Sc, respectively, from first and second spray holes 110 and 120 of injector 100, the fuels hit profile surface 5 at different positions from critical height T because spray angle Sb of first spray hole 110 is smaller than spray angle Sc of second spray hole 120.

That is, first spray fuel 210 sprayed at relatively smaller spray angle Sb travels to the lower space of the combustion chamber which is formed by bowl rim 8 and second spray fuel 220 sprayed at relatively larger spray angle Sc travels to the upper space of the combustion chamber which is formed by inclined portion 6.

Spray angles Sb and Sc of first and second spray holes 110 and 120 cannot be specified because the optimal values change in accordance with the engine specifications.

However, in the exemplary embodiment, it was found that the fuels travel to different positions of profile surface 5 from critical height T, when spray angle Sb of first spray hole 110 is about 146 degrees and spray angle Sc of second spray hole 120 is about 166 degrees.

Figure 4A:
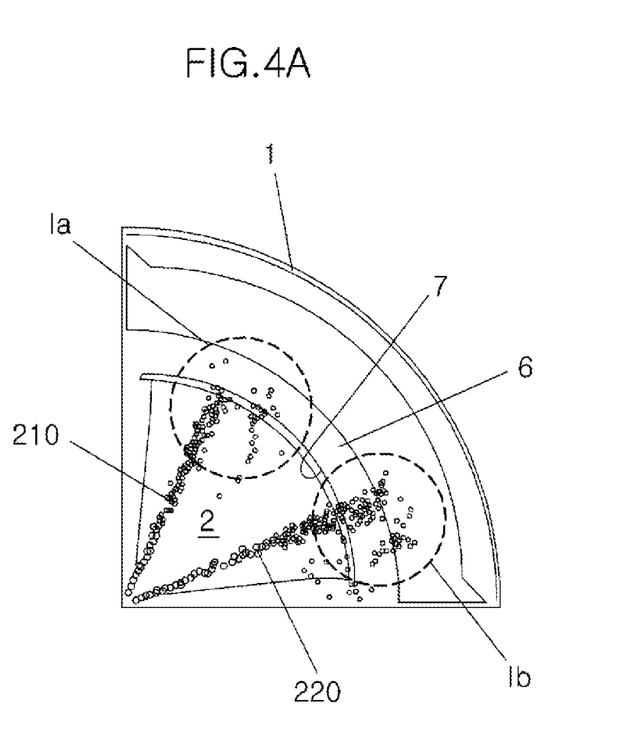
FIGS. 4A and 4B are views showing when spray overlap is not generated in FIG. 3.
Figure 4B:
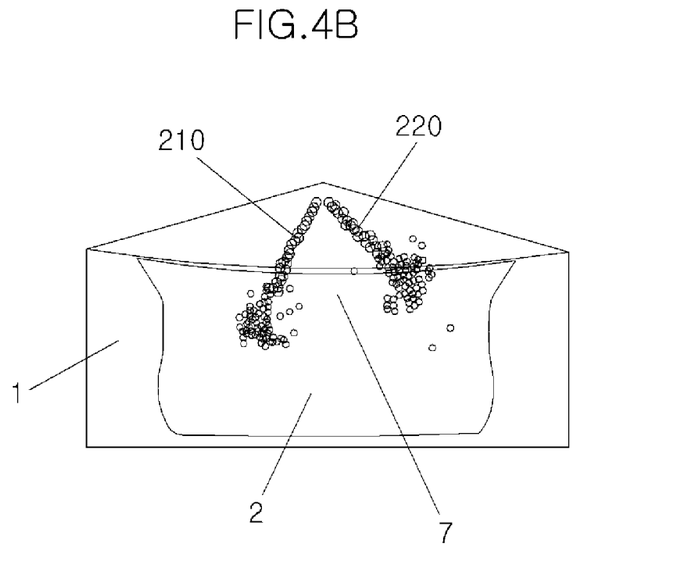

FIGS. 4A and 4B show when spray overlap is not generated even if first spray fuel 210 and second spray fuel 220 are simultaneously sprayed as shown in FIG. 3.

As shown in the figure, since combustion chamber 2 is divided into the upper space of the combustion chamber 2 and the lower space of the combustion chamber 2 by protrusion 7 of profile surface 5, first spray fuel 210 can travel to the lower space of the combustion chamber 2 and second spray fuel 220 can travel to the upper space of the combustion chamber 2.

Therefore, in the exemplary embodiment, even if first spray fuel 210 and second spray fuel 220 are simultaneously sprayed, a height difference is generated between the upper portion of protrusion 7 and the lower portion of protrusion 7.

First spray fuel 210 and second spray fuel 220 simultaneously hit against profile surface 5 due to the height difference, such that an overlap area is not formed when atomization areas Ia and Ib are formed.

Therefore, it is possible to completely remove the reason due to overlap of two or more spray fuels simultaneously sprayed, in the reasons causing incompletion combustion.

Therefore, it is possible to greatly increase the fuel efficiency of a diesel engine equipped with the piston having combustion chamber 2 according to the exemplary embodiment and increase performance of largely reducing the amount of noxious exhaust gas.

As described above, in combustion chamber 2 according to the exemplary embodiment, it is possible to form the upper portion of the combustion space and the lower portion of the combustion space above/under protrusion 7, respectively, by using protrusion 7 protruding toward the center of the combustion space, on profile surface 5 forming the inner wall to form the combustion space.

Therefore, the spray fuel sprayed toward profile surface 5 can be divided into the flow at the upper portion of the combustion space and the flow at the lower portion of the combustion space with respect to protrusion 7, such that it is possible to considerably increase the gas mixture generation ratio. Further, two or more spray fuels simultaneously sprayed do not overlap, such that it is possible to prevent the incomplete combustion decreasing the fuel efficiency and increasing the amount of noxious exhaust gas.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A diesel engine piston having a combustion chamber comprising:
   a profile surface that protrudes toward a center axis of the combustion chamber from an inner wall thereof and includes a protrusion on the inner wall, the protrusion extending from the inner wall with a predetermined length;
   wherein the protrusion divides a spray fuel, which is sprayed and atomized onto the protrusion, into a fuel flow at an upper portion of the combustion chamber and a fuel flow at a lower portion of the combustion chamber, respectively;
   wherein the profile surface includes:
      an inclined portion that is connected to the protrusion and a top of a piston body above the protrusion and forms the upper portion of the combustion chamber, and
      a bowl rim connected to a base and the protrusion and formed in a recessed arc shape below the protrusion to form the lower portion of the combustion chamber;
   wherein an end portion of the base is connected to the bowl rim;
   wherein the other end portion of the base is formed flat and connected a pip, wherein the pip is protruded inward from the base in the combustion chamber; and
   wherein the inclined portion is a flat straight inclined surface and the protrusion is a flat straight vertical surface opposite to the center axis of the combustion chamber.

2. The diesel engine piston as defined in claim 1,
   wherein the combustion chamber has a bottom formed by the flat base, and
   wherein the pip protrudes in a conical shape from the base toward the center axis of the combustion chamber with a predetermined angle and is formed to be symmetric with respect to the center axis of the combustion chamber.

3. The diesel engine piston as defined in claim 1, wherein a position where the protrusion starts to be connected to the inclined portion faces a traveling direction of the spray fuel sprayed toward the inner wall.

4. The diesel engine piston as defined in claim 1,
   wherein a position where the protrusion starts to be connected to the inclined portion faces a traveling direction of a first spray fuel sprayed toward the inner wall, and
   wherein a position where the protrusion starts to be connected to a bowl rim faces a traveling direction of a second spray fuel sprayed toward the inner wall.

5. The diesel engine piston as defined in claim 4, wherein the profile surface further includes:
   the bowl rim connected to the base of the combustion chamber and the protrusion and formed in a recessed arc shape below the protrusion to form the lower portion of the combustion chamber.

6. The diesel engine piston as defined in claim 1, wherein a length of a formation height and a connection height is the same as a protrusion height of the pip.

7. The diesel engine piston as defined in claim 1, wherein edges of the flat straight vertical surface opposite to the center axis of the combustion chamber are rounded, in the protrusion.

8. The diesel engine piston as defined in claim 1, wherein the flat straight vertical surface opposite to the center axis of the combustion chamber is formed at an acute angle or an obtuse angle, in the protrusion.

9. The diesel engine piston as defined in claim 1, wherein the inclined portion is connected to the top while diverging with respect to the center axis of the combustion chamber.

* * * * *